United States Patent
Zhang

(10) Patent No.: US 10,496,383 B2
(45) Date of Patent: Dec. 3, 2019

(54) METHODS AND APPARATUS TO CONVERT A NON-SERIES-PARALLEL CONTROL FLOW GRAPH TO DATA FLOW

(71) Applicant: Intel Corporation, Santa Clara, CA (US)

(72) Inventor: Yongzhi Zhang, Wayland, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/849,307

(22) Filed: Dec. 20, 2017

(65) Prior Publication Data

US 2019/0042216 A1 Feb. 7, 2019

(51) Int. Cl.
G06F 9/45 (2006.01)
G06F 8/41 (2018.01)

(52) U.S. Cl.
CPC ............ *G06F 8/433* (2013.01); *G06F 8/443* (2013.01); *G06F 8/453* (2013.01); *G06F 8/456* (2013.01)

(58) Field of Classification Search
CPC .................................. G06F 8/443; G06F 8/433
USPC ........................................................ 717/155
See application file for complete search history.

(56) References Cited

U.S. PATENT DOCUMENTS

| | | | | |
|---|---|---|---|---|
| 5,251,322 A * | 10/1993 | Doyle | ............... | G06T 17/00 345/501 |
| 6,763,515 B1 * | 7/2004 | Vazquez | ............... | G06F 8/34 715/967 |
| 7,702,499 B1 * | 4/2010 | Lavagno | ............... | G06F 11/3612 703/27 |
| 9,946,520 B1 * | 4/2018 | Houchard | ............... | H04L 67/02 |
| 2002/0046294 A1 * | 4/2002 | Brodsky | ............... | G06F 9/541 709/246 |
| 2004/0003376 A1 * | 1/2004 | May | ............... | G06F 8/314 717/132 |
| 2004/0243529 A1 * | 12/2004 | Stoneman | ............... | G06N 20/00 706/10 |
| 2007/0083857 A1 * | 4/2007 | Jiang | ............... | G06F 8/456 717/130 |
| 2008/0022264 A1 * | 1/2008 | Macklem | ............... | G06F 8/34 717/136 |
| 2008/0250434 A1 * | 10/2008 | Ho | ............... | G06F 9/5027 719/329 |

(Continued)

OTHER PUBLICATIONS

Title: Program-object level data flow analysis with applications to data leakage and contamination forensics, author: G Xiao et al, published on 2016.*

(Continued)

*Primary Examiner* — Chameli Das
(74) *Attorney, Agent, or Firm* — Hanley, Flight & Zimmerman, LLC

(57) ABSTRACT

Methods and apparatus to convert a non-series-parallel control flow graph to data flow. An example apparatus includes a node analyzer to detect a non-series-parallel node in sequential code, and an instruction generator to: generate instructions for prior nodes associated with the detected non-series-parallel node including a consumption operand, generate a combination instruction to combine results of the instructions generated for the prior nodes, and output the combination instructions and the instructions generated for the prior nodes to generate data flow code.

18 Claims, 6 Drawing Sheets

(56) References Cited

U.S. PATENT DOCUMENTS

| | | | | |
|---|---|---|---|---|
| 2011/0231636 A1* | 9/2011 | Olson | ................. | H03M 13/158 |
| | | | | 712/222 |
| 2013/0291113 A1* | 10/2013 | Dewey | ................... | G06F 8/433 |
| | | | | 726/25 |
| 2014/0344633 A1* | 11/2014 | Li | ...................... | G06F 11/0784 |
| | | | | 714/57 |
| 2015/0242193 A1* | 8/2015 | Kee | ........................ | G06F 8/34 |
| | | | | 717/145 |
| 2017/0116108 A1* | 4/2017 | Miskelly | ............ | G06F 11/3624 |
| 2018/0367584 A1* | 12/2018 | Shi | ........................ | G06F 9/5083 |

OTHER PUBLICATIONS

Thomas Ball, "What's in a region? Or computing control dependences in near-linear time for reducible control flow", ACM Letters on Programming Languages and Systems (LOPLAS), 2(1-4):1-16, Dec. 1993, 24 pages.

Coral Collaboration, "Benchmark Codes", Oak Ridge, Argonne, Livermore, Jun. 19, 2014, accessed on Dec. 20, 2017, [https://asc.llnl.gov/CORAL-benchmarks/], 5 pages.

Kermin Elliot Fleming, Jr., "Scalable Recontigurable Computing Leveraging Latency-Insensitive Channels", PhD Thesis, MIT, Cambridge, MA, Feb. 2013, 197 pages.

Shuo Li, "Case Study: Computing Black-Scholes with Intel® Advanced Vector Extensions", Sep. 6, 2012, accessed on Dec. 20, 2017, [https://software.intel.com/en-us/articles/case-study-computing-black-scholes-with-intel-advanced-vector-extensions], 13 pages.

John D. Mccalpin, "Memory Bandwidth and Machine Balance in Current High Performance Computers", IEEE Computer Society Technical Committee on Computer Architecture (TCCA) Newsletter, pp. 19-25, Dec. 1995, 8 pages.

John D. Mccalpin, "Stream: Sustainable Memory Bandwidth in High Performance Computers", 2016, accessed on Dec. 20, 2017, [https://www.cs.virginia.edu/stream/], 4 pages.

* cited by examiner

METHODS AND APPARATUS TO CONVERT A NON-SERIES-PARALLEL CONTROL FLOW GRAPH TO DATA FLOW

FIELD OF THE DISCLOSURE

This disclosure relates generally to compilers in computing systems, and, more particularly, to methods and apparatus to increase compiler efficiency in computing systems by converting non-series-parallel control flow graph to data flow.

BACKGROUND

Many computing systems operate according to a control flow architecture. In a control flow architecture, the execution of instructions of a program is driven by a program counter that steps through the instructions of a program. In other words, the order of execution of the instructions of the program is defined by the structure of the program itself. In some cases, a control flow architecture may operate improperly when attempting to implement parallel processing. For example, a program may state that an instruction is to be executed even though an input (e.g., operand) of the instruction has not yet been updated by a parallel operating instruction.

Some computing systems utilize a data flow architecture. A data flow architecture is not driven by an order of instruction execution defined by a program. Instead, a data flow architecture executions instruction according to the availability of the inputs (e.g., operands) of the instruction. For example, if an instruction has three operands, a computing system utilizing a data flow architecture will execute the instruction as soon as the three operands are provided to the instruction by other instruction(s) on which the instruction depends. Accordingly, a data flow architecture can perform in a highly parallel environment without concern that instructions will execute before their data dependencies are updated/satisfied. For example, a data flow architecture may be utilized in large scale computing systems that use massive numbers of processing elements to highly parallelize processing.

The figures are not to scale. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Series-Parallel Graph is widely used in both applied engineering and theory of algorithms research. Some graph problems that are in-general NP-Complete can be solved in linear time if the graph is a Series-Parallel Graph. Highly efficient algorithms have been developed to generate highly parallel data flow code for control flow graphs that are Series-Parallel graph.

A directed graph G is two-terminal series-parallel, with terminals s and t, if it can be produced by a sequence of the following operations:

1. Create a new graph, consisting of a single edge directed from s to t.
2. Given two two-terminal series-parallel graphs X and Y, with terminals sX, tX, sY, and tY, form a new graph G=P(X, Y) by identifying s=sX=sY and t=tX=tY. This is known as the parallel composition of X and Y.
3. Given two two-terminal series-parallel graphs X and Y, with terminals sX, tX, sY, and tY, form a new graph G=S(X, Y) by identifying s=sX, tX=sY, and t=tY. This is known as the series composition of X and Y.

An undirected graph is two terminal series-parallel with terminals s and t if, for some orientation of its edges, it forms a directed two terminal series-parallel graph with those terminals. A directed or undirected graph is series-parallel if, for some two vertices s and t, it is two terminal series-parallel with those terminals.

While data flow architectures may be advantageously utilized in computing systems, not all programs are designed and/or capable of being written directly in data flow code. For example, existing programs may be implemented for a control flow architecture. Methods and apparatus disclosed herein facilitate the conversion of a control flow program to a data flow program. In particular, methods and apparatus disclosed herein identify non-series-parallel control flow in a program (e.g., the example non-series-parallel flow of FIG. 4) and convert the non-series-parallel flow control to data flow code. Accordingly, in some disclosed examples, a traditional program with complex control flow may be run in a highly parallel data flow architecture.

Figure 1:
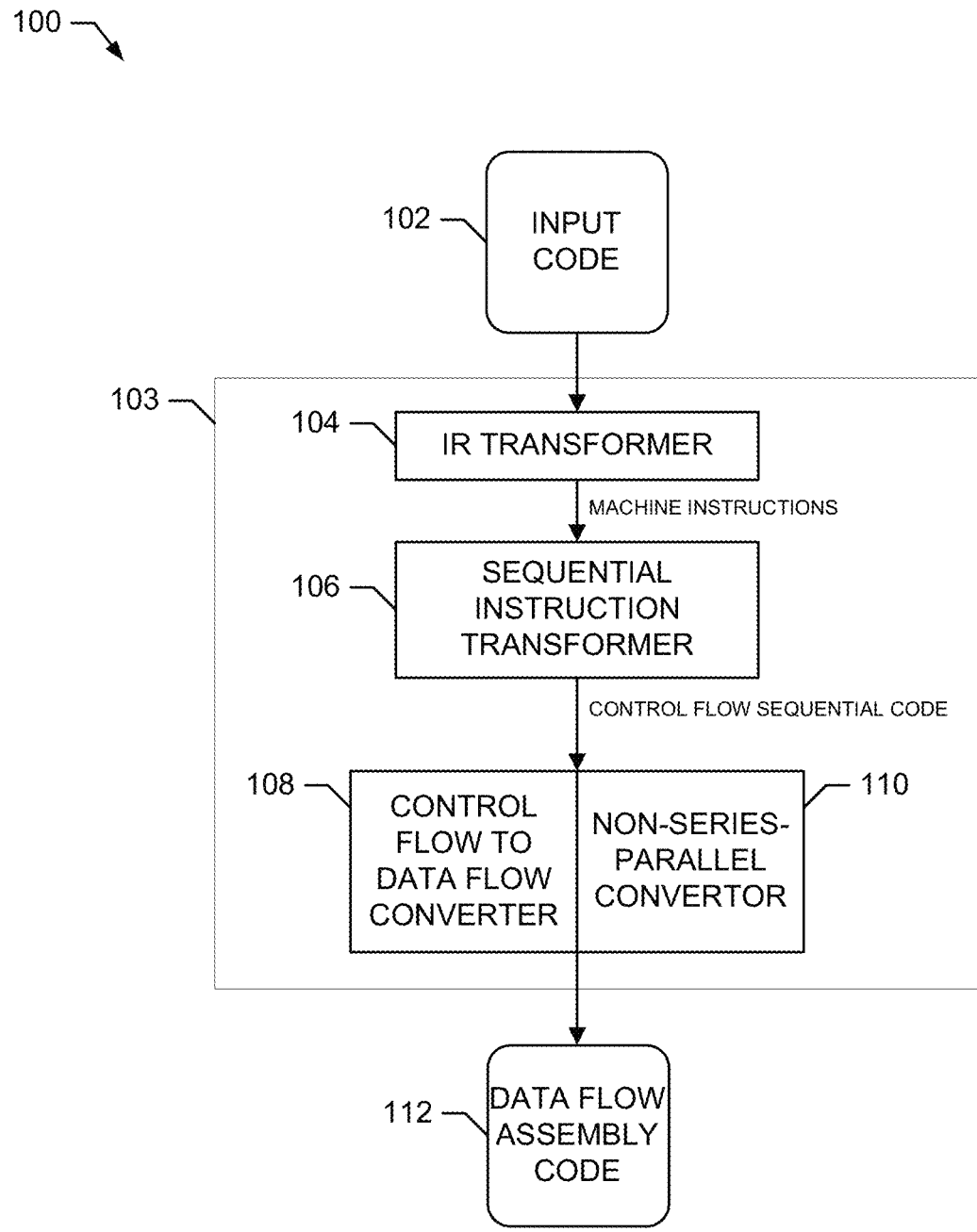
FIG. 1 is a block diagram of an example system for converting control flow code to data flow code.

FIG. 1 is a block diagram of an example system 100 including an example input code 102 compiled by an example compiler 103 to generate an example data flow assembly code 112. For example, the system 100 may be implemented within a compiler to convert control flow code to data flow code.

The input code 102 of the illustrated example is a sequential instruction software program to be converted and compiled to assembly code (e.g., for execution on a computing platform). The example input code 102 is written in the C programming language. Alternatively, the input code may be written in an any other language such as C++, Fortran, Java, etc.

The example compiler 103 includes an example intermediate representation (IR) transformer 304, an example sequential transformer 106, an example control flow to data flow converter 108, and an example non-series-parallel converter 110. The compiler 103 of the illustrated example is an LLVM compiler that has been modified to include the non-series parallel converter 110. Alternatively, any other type of pre-existing or newly created compiler may be utilized.

The IR transformer 104 of the illustrated example transforms the example input code 102 to intermediate representation code. The example IR transformer 104 transforms the input code 102 to LLVM intermediate representation. Alternatively, the IR transformer 104 may transform the input code 102 to any type of intermediate representation recognized by a compiler utilized in the system 100 (e.g., Standard Portable Intermediate Representation, Java Bytecode, Common Intermediate Representation, etc.).

The example sequential instruction transformer 106 transforms the intermediate representation from the IR transformer 104 into sequential control flow machine instructions of a target machine. According to the illustrated example, the sequential instruction transformer 104 transforms intermediate representation code one section at a time to facilitate validation and conversion to data flow instructions.

The example control flow to data flow converter 108 converts the control flow sequential instructions to data flow assembly code 112. The example control flow to data flow converter 108 uses well known techniques for converting series-parallel control flow code to data flow code.

The example control flow to data flow converter 108 utilizes two basic data flow instructions SWITCH and PICK.

A PICK instruction picks a value out of two registers based on a predicate. PICK has the following format: % r=PICK % r0, % r1, % r2, where % r is the notation of a virtual register in LLVM. Such an instruction can be written in C programming language as % r=(% r0)? (% r2): (% r1);

A SWITCH instruction sends an operands to one of two identified registers based on a predicate. SWITCH has the following format: % r1, % r2=SWITCH % r0, % r3, where it sends the value in % r3 to either % r1 or % r2 based on the predicate in % r0. In C it is like: if (% r0) % r2=% r3 else % r1=% r3.

Figure 3:
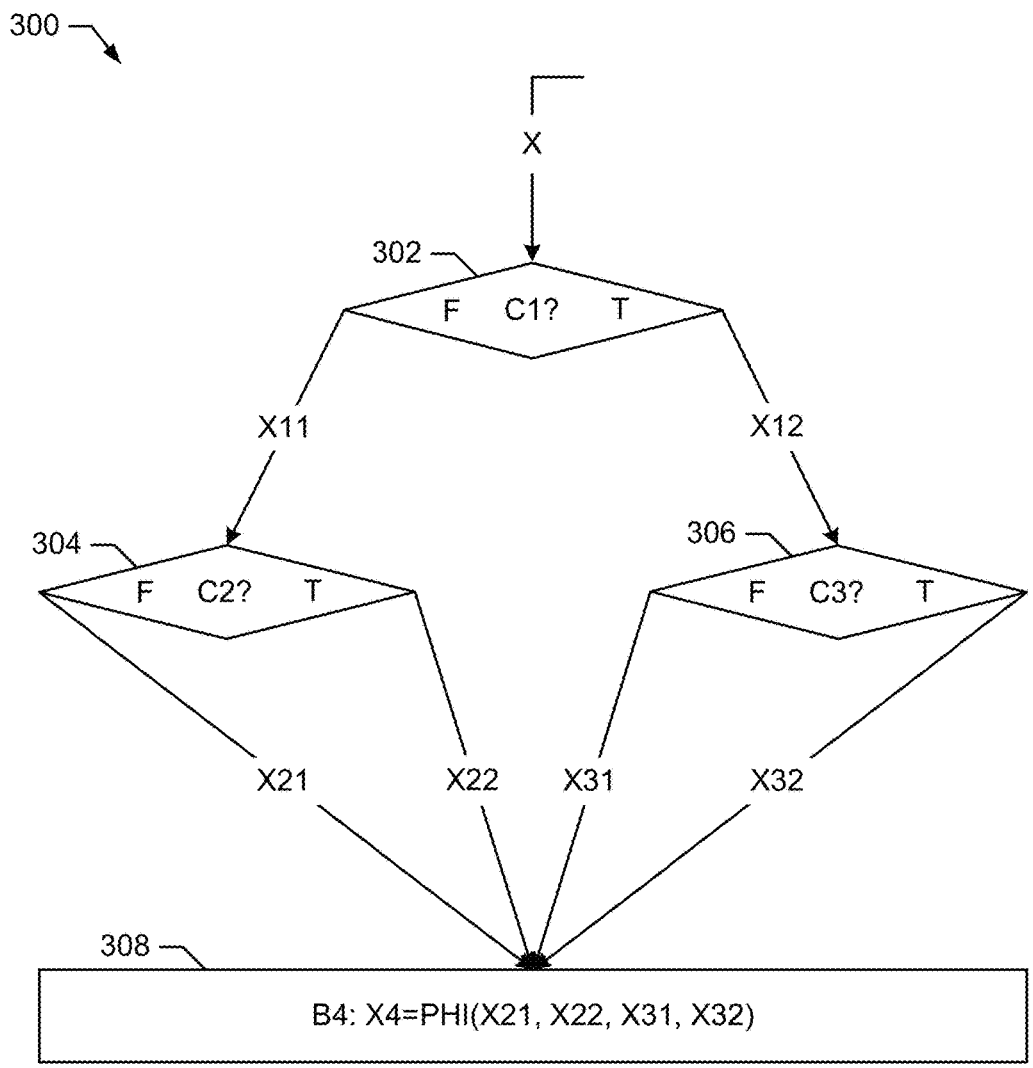
FIG. 3 illustrates an example control flow graph that is series-parallel.

For example, FIG. 3 illustrates an example control flow graph 300 that is series-parallel. In the illustrated example, first node 302 assigns the value X to X11 or X12 based on the value of C1. (e.g., if C1 is false X11=X and if C1 is true X12=X. Similarly, second node 304 assigns the value X11 to X21 when C2 is false and assigns the value X11 to X22 when C2 is true. Third node 306 assigns the value X12 to X31 when C3 is false and assigns the value X12 to X32 when C3 is true. Lastly, fourth node 308 is a Phi operation operating on X21, X22, X31, and X32. The Phi function is a pseudo-function in static single assignment form. The Phi function will assign to X4 the value on which control arrived to the fourth node 308 (e.g., one of X21, X22, X31, or X32).

According to the example control flow graph 300, the second node 304 is in series with the first node 302 and in parallel with the third node 306. Accordingly, because the control flow graph 300 is series-parallel, the control flow graph 300 may be easily converted to data flow using well-known techniques.

For example, in converting the control flow code represented by FIG. 3 to data flow code, the example control flow to data flow converter would generate the following PICK tree: X2=PICK C2, X21, X22; X3=PICK C3, X31, X32; and X4=PICK C1, X2, X3.

Figure 4:
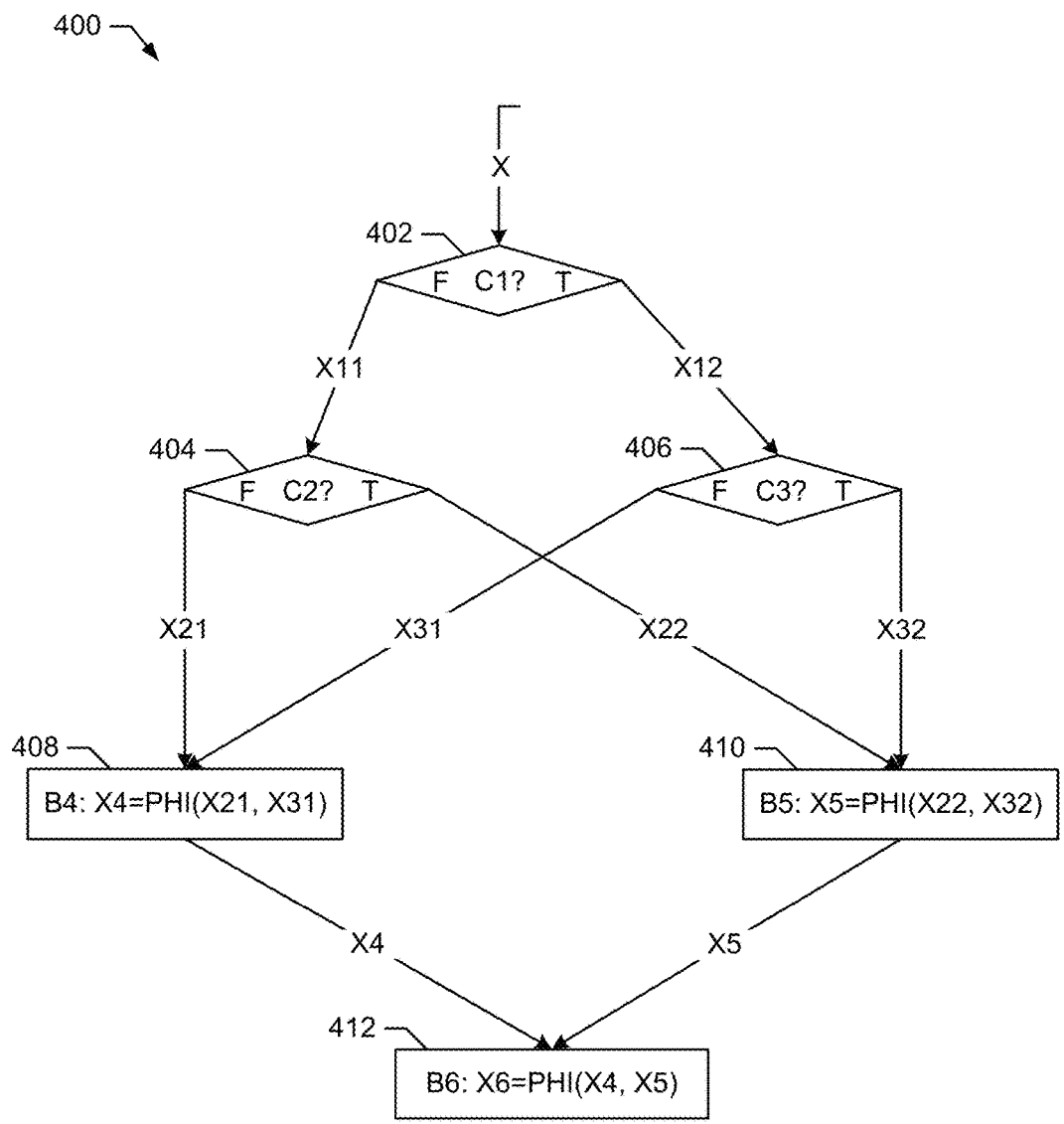
FIG. 4 illustrates an example control flow graph that includes nodes that are non-series-parallel.

In practice, many control flow graphs are series-parallel or can be easily reduced to series-parallel using well known techniques. However, some control flow graphs are not easily converted. For example, gotos, indirect jumps, or optimizations such as inline function calls and unroll loops, can create very complex control flow graphs that are not reducible to series-parallel graphs. For example, FIG. 4 illustrates an example control flow graph 400 that is generated using goto commands to include a first node 402, a second node 404, a third node 406, a fourth node 408, a fifth node 410, and a sixth node 412. The control flow graph 400 of FIG. 4 is non-series-parallel because the example first node 402 and the example second node 404 are not added to the graph using either series or parallel composition.

The example control flow to data flow converter 108 also includes the example non-series-parallel converter 110 to detect non-series-parallel code within the control flow sequential code from the sequential instruction transformer 106 and to convert the non-series-parallel code to data flow code. For example, when applied to the instructions illustrated by FIG. 4, the non-series-parallel converter 110 detects that the instructions include non-series-parallel code that cannot be converted to parallel optimized data flow code according to prior methods. For example, in computing the out-going value for X from the example fourth node 408, the evaluation of the predicate value C2 only is not sufficient. The evaluation of C3 is also needed. Additionally, the order of evaluation matters, because if the branch to C2 is taken, C3 will have no value in a data flow machine. Complicated logical combinations of C2 and C3 or enforcing evaluation of both branches are needed to compute X4 in the fourth node 408 and the same is true for X5 in the fifth node 410, both of which waste power.

To facilitate the conversion of non-series-parallel code to data flow code that may be used, for example, in highly parallel environments, the example non-series-parallel converter 110 utilizes a consumption operand for which any value is consumed by the system. An example consumption operand is % ign, which may be referred to as an ignore operand. A value assigned to the consumption operand is not stored. According to the illustrated example, the non-series-parallel converter 110 includes a consumption operand in a PICK instruction to account for branches of a node tree that may not be relevant for determination of a particular value.

For example, the non-series-parallel converter 110 may generate the following PICK tree for determining the value of X4 in the example fourth node 408: X2=PICK C2, X21% ign; X3=PICK C3, X31, % ign; and X4=PICK C1, X2, X3.

Figure 2:
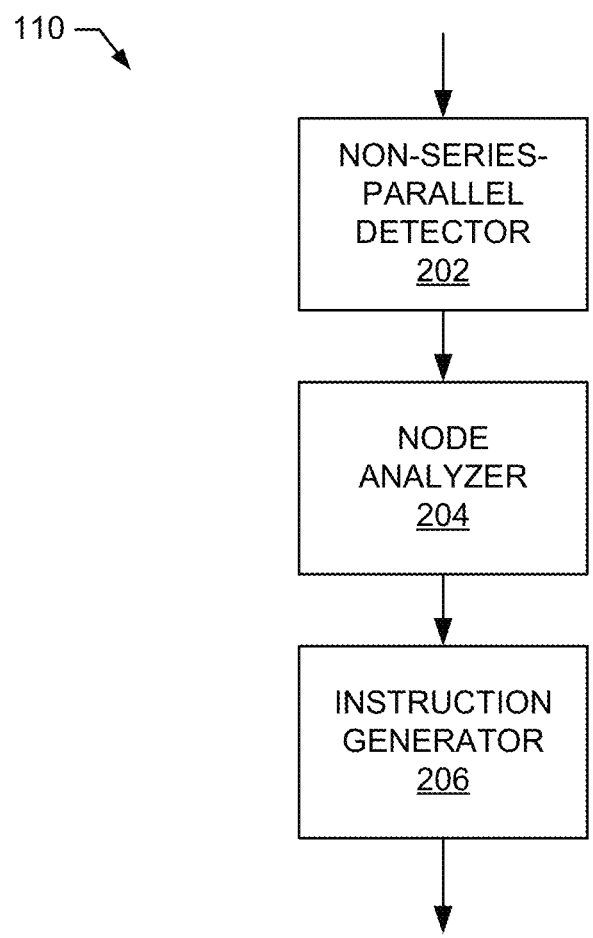
FIG. 2 is a block diagram of an example implementation of the non-series-parallel converter of FIG. 1.

FIG. 2 is a block diagram of an example implementation of the non-series-parallel converter 110 of FIG. 1. The example non-series-parallel converter 110 of FIG. 2 includes an example non-series-parallel detector 202, an example node analyzer 204, and an example instruction generator 206.

The example non-series-parallel detector 202 analyzes the control flow sequential code processed by the example control flow to data flow converter 108 to identify code that is non-series-parallel. The example non-series detector 202 uses the concept Control Dependence Graph (CDG) to detect non-series-parallel graph. In a traditional control flow graph, if a node B is on one path from a node A to the exit (sink) node of the control flow graph, and there are other paths from node A to exit without going through node B, then node B is Control Dependent on node A. In a corresponding Control Dependent Graph, there is an edge from A to B. Node A is called a parent node of node B. The example non-series parallel detector 202 constructs a control dependence graph for the input program's control flow graph. A graph is series-parallel when the CDG has the property that each node has one and only one control dependence parent. The example non-series parallel detector 202 identifies a non-series parallel graph when at least one node has other than one and only one control dependence parent (e.g., more than one parent, zero parents, etc.).

For example, the non-series-parallel detector 202 may apply a set of rules to identify non-series-parallel code. In some examples, the non-series-parallel detector 202 may determine that code is not series-parallel (e.g., does not meet a rule for series-parallel code). In other examples, the non-series-parallel detector 202 may determine that code is non-series-parallel (e.g., meets a rule for non-series-parallel code). For example, the non-series-parallel detector 202 may determine that code is non-series-parallel when the code includes nodes that are neither series nor parallel with other nodes. For example, code that does not meet the following rules may be classified as non-series-parallel:

Given two two-terminal series-parallel graphs X and Y, with terminals sX, tX, sY, and tY, form a new graph G=P(X, Y) by identifying s=sX=sY and t=tX=tY. This is known as the parallel composition of X and Y.

Given two two-terminal series-parallel graphs X and Y, with terminals sX, tX, sY, and tY, form a new graph G=S(X, Y) by identifying s=sX, tX=sY, and t=tY. This is known as the series composition of X and Y.

When the example non-series-parallel detector 202 identifies code that is non-series-parallel, the non-series parallel detector 202 triggers analysis by the example node analyzer 204.

The example node analyzer 204 of the illustrated example analyzes the code to identify a non-series-parallel node(s). For example, the node analyzer 204 may identify a node that is not series and/or parallel. The example node analyzer 204 triggers the example instruction generator 206 to determine PICK instructions for the non-series-parallel node.

The example instruction generator 206 generates PICK instructions to convert the non-series-parallel control flow sequential code to data flow code. The example instruction generator 206 generates data flow code by analyzing the non-series parallel node and prior nodes to generate PICK instructions that include a consumption operand (e.g., an ignore operand such as % ign). While the illustrated example uses PICK instructions, any instruction of a compiler that selects a value from operands based on a predicate may be utilized.

When analyzes a node and its prior nodes, the example instruction generator 206 generates a PICK instruction for each prior node and sets the first operand to be the value that may propagate to the non-series-parallel node and sets the second operand to the consumption operand (e.g., because the second possible path from the prior node does not propagate to the non-series parallel node. For example, when generating PICK instructions for the fourth node 408 of FIG. 4, for the second node 404 of FIG. 4, the instruction generator 206 generates a PICK instruction X2=PICK C2, X21, % ign. In this instance, the second output from the second node 404 does not propagate to the fourth node 408 and, thus, is set to the consumption operand to ensure that the PICK instruction is executed and does not propagate a value to X4 when C2 is true to stay consistent with the desired operation as programmed in the input code. Thus, the instruction generator 206 may generate the following PICK tree for the fourth node 408: X2=PICK C2, X21% ign; X3=PICK C3, X31, % ign; and X4=PICK C1, X2, X3.

In some examples, where the processing architecture on which the code is to be executed does not propagate the consumption operand, the instruction generator 206 may utilize a white value such as zero and may include a SWITCH instruction to consume the zero if the execution of the code branches away from a node. For example, for the fourth node 408, the instruction generator may generate the following data flow code:

X2=PICK C2, X21, 0
X3=PICK C3, X31, 0
X'4=PICK C1, X2, X3

E2=!C1 && C2//branch C2→B5 is taken
E3=C1 && C3//branch C2→B5 is taken
E=E1||E2
X4, % ign=SWITCH E, X'4

In this example, && is short-circuited logical AND and || is short-circuited logical OR. The short-circuited nature of those operators save power consumption do to only evaluating the second operand if the first operand does not decide the output of the operator. Furthermore, the white value (e.g., zero) never changes when propagating in the PICK tree, which also consumes less power during execution.

While an example manner of implementing the non-series-parallel converter 110 is illustrated in FIG. 1, one or more of the elements, processes and/or devices illustrated in FIG. 1 may be combined, divided, re-arranged, omitted, eliminated and/or implemented in any other way. Further, the example non-series-parallel detector 202, the example node analyzer 204, the example instruction generator 206, and/or more generally the example non-series-parallel converter 110 may be implemented by hardware, software, firmware and/or any combination of hardware, software and/or firmware. Thus, for example, any of the example non-series-parallel detector 202, the example node analyzer 204, the example instruction generator 206, and/or more generally the example non-series-parallel converter 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example non-series-parallel detector 202, the example node analyzer 204, the example instruction generator 206, and/or more generally the example non-series-parallel converter 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example non-series-parallel converter 110 may include one or more elements, processes and/or devices in addition to, or instead of, those illustrated in FIG. 2, and/or may include more than one of any or all of the illustrated elements, processes and devices.

Figure 5:
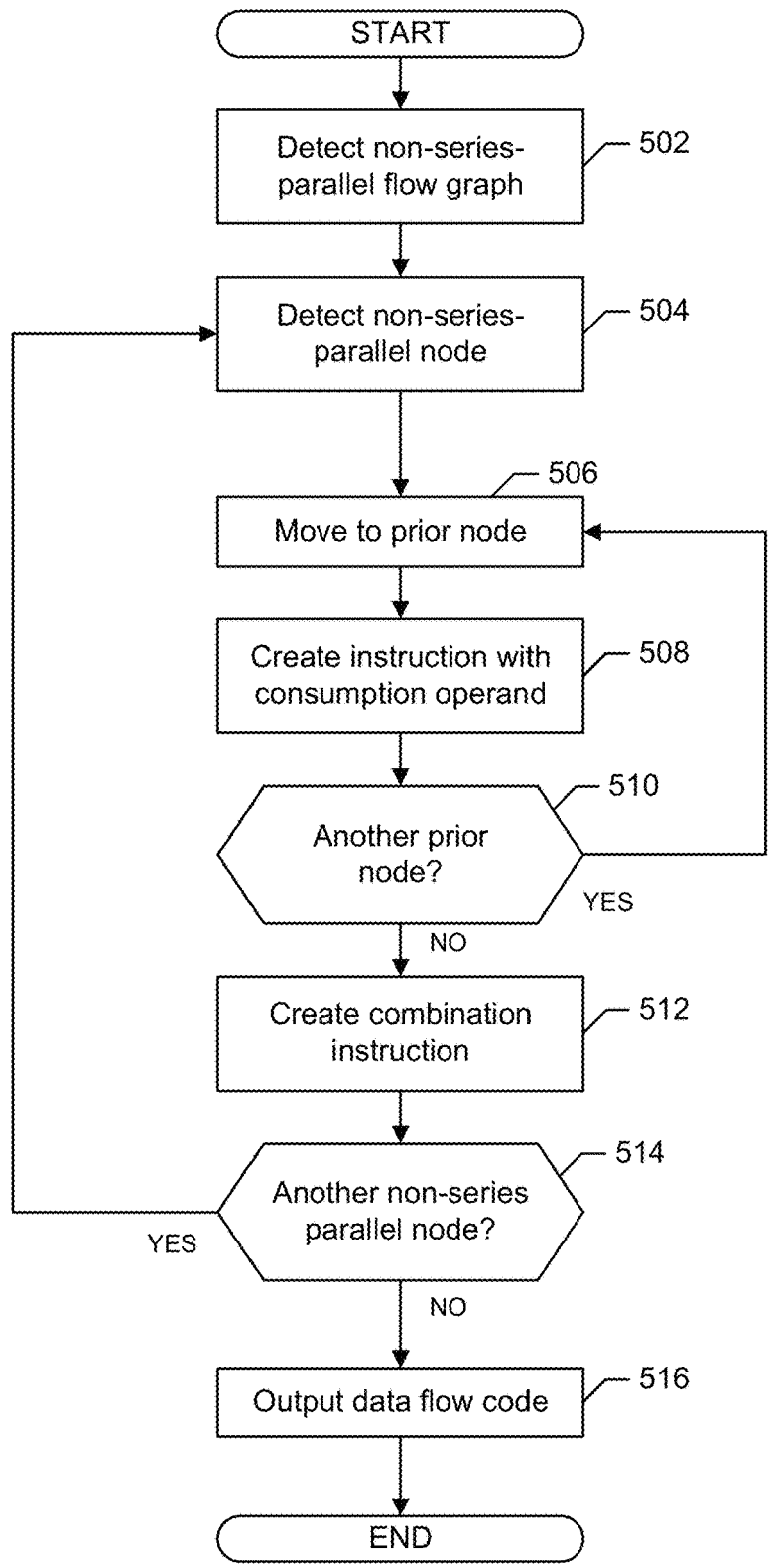
FIG. 5 is a flowchart representative of example machine readable instructions for implementing the non-series-parallel converter of FIG. 3 and/or FIG. 4.

A flowchart representative of example machine readable instructions for implementing the non-series-parallel converter 110 is shown in FIG. 5. In the example, the machine readable instructions comprise a program for execution by a processor such as the application processor 610 of FIG. 6 and/or the processor 612 shown in the example processor platform 600 discussed below in connection with FIG. 6. The program may be embodied in software stored on a non-transitory computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example non-series parallel converter 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example process of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 5 begins when the non-series-parallel detector 202 detects a non-series-parallel flow graph being processed by the example control flow to data flow converter 108 (block 502). For example, the non-series-parallel detector 202 may apply one or more rules to the control flow sequential code to test for non-series-parallel nodes. In response to detecting a non-series-parallel flow graph, the example node analyzer 204 detects a non-series parallel node (block 504). For example, when processing the code illustrated by FIG. 4, the example node analyzer 204 may detect that the example fourth node 408 is a non-series-parallel node.

In response to detecting a non-series-parallel node, the example node analyzer 204 selects a node prior to the non-series-parallel node in the sequential code (block 506). For example, when processing the fourth node 408 of FIG. 4 as a non-series-parallel node, the node analyzer 204 selects the example second node 404 as a prior node. The example instruction generator 206 generates a PICK instruction with an ignore operand for the selected prior node (block 508). For example, when processing the second node 404 of FIG. 4 as a prior node of the fourth node 408, the instruction generator 206 generates X2=PICK C2, X21, % ign. While the example instruction generator 206 generates a PICK instruction, any similar instruction for a particular compiler environment employing a consumption operand may be utilized. For example, any instruction that ensures that predicates are evaluated with a consumption operand (e.g., an ignore operand, a white value, etc.) may be utilized.

The example node analyzer 204 determines if there is another prior node (block 510). When there is another prior node, control returns to block 506 to generate a PICK instruction for that prior node. For example, after processing the second node 404, the third node 406 may be processed.

When there is not another prior node (block 510), the example instruction generator 206 generates an instruction to combine the results of the PICK instructions from the prior nodes. According to the illustrated example, the instruction generator 206 generates a PICK instruction to combine to results of the prior nodes. For example, when generating instructions for the fourth node 408, after generating PICK instructions for the second node 404 and the third node 406, the example instruction generator 206 generates: X4=PICK C1, X2, X3.

The example node analyzer 204 determines if there is another non-series-parallel node in the code being analyzed (block 514). When there is another non-series-parallel node, control returns to block 502 to process the next node to generate the data flow assembly code 112. When there is not another non-series-parallel node, the example instruction generator 206 outputs the generated data flow code (block 516) and the program of FIG. 5 ends.

While the foregoing example generates instructions for an environment in which the consumption operand is propagated, in some environments, such a consumption operand is not propagated. In environments that don't support propagation of the consumption operand, the consumption operand may be replaced with a white value such as such as zero (e.g., X2=PICK C2, X21, 0 and X3=PICK C3, X31, 0). In addition, the instruction for combining the elements (block 512) may include several instructions to select the appropriate value. For example, the combining instruction may store the value in a temporary register (X'4=PICK C1, X2, X3) and the final value may be selected using a switch to make sure that the white value is consumed (E2=!C1 && C2; E3=C1 && C3; E=E1||E2; and X4, % ign=SWITCH E, X'4).

Figure 6:
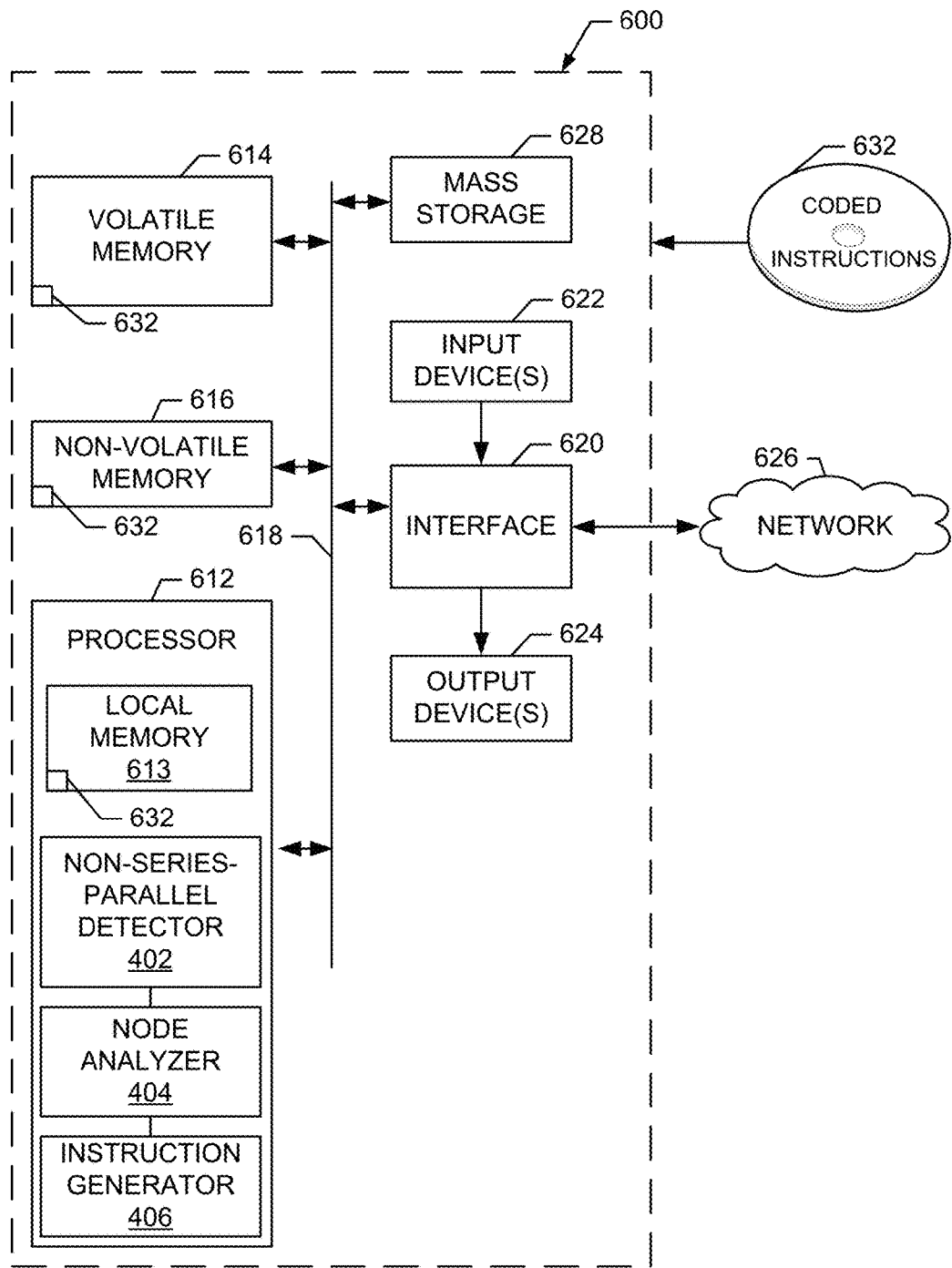
FIG. 6 is a block diagram of an example processing device that may execute the instructions of FIG. 5 to implement the non-series-parallel converter of FIG. 3 and/or FIG. 4.

FIG. 6 is a block diagram of an example processor platform 600 capable of executing the instructions of FIG. 5 to implement the non-series-parallel converter 110 of FIG. 1. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The hardware processor may be a semiconductor based (e.g., silicon based) device. In this example, the processor 612 implements the non-series-parallel detector 202, the node analyzer 204, and the instruction generator 206.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 5 may be stored in the mass storage device 628, in the volatile memory 614, in the non-volatile memory 616, and/or on a removable tangible computer readable storage medium such as a CD or DVD.

Example methods, apparatus, systems and articles of manufacture to convert a non-series parallel control flow graph to data flow are disclosed herein. Further examples and combinations thereof include the following.

Example 1 includes an apparatus to convert a control flow code to data flow code, the apparatus comprising a node analyzer to detect a non-series-parallel node in sequential code, and an instruction generator to generate instructions for prior nodes including a consumption operand, generate a combination instruction to combine results of the instructions, and output the combination instructions and the instructions to generate data flow code.

Example 2 includes an apparatus as defined in example 1, wherein the consumption operand is an ignore operand.

Example 3 includes an apparatus as defined in example 1 or example 2, further including a non-series-parallel detector to detect that a control flow graph of the sequential code is a non-series-parallel flow graph.

Example 4 includes an apparatus as defined in example 1 or example 2, wherein the instructions are pick instructions.

Example 5 includes an apparatus as defined in example 1, wherein the consumption operand is a white value.

Example 6 includes an apparatus as defined in example 5, wherein the instruction generator is further to generate instructions to consume the white value.

Example 7 includes an apparatus as defined in example 1 or example 2, wherein the node analyzer is to detect the non-series parallel node by analyzing a control dependence graph.

Example 8 includes an apparatus as defined in example 7, wherein the node analyzer is to identify the non-series parallel node when the control dependence graph has more than one parent for the non-series parallel node.

Example 9 includes a non-transitory computer readable medium comprising instructions that, when executed, cause a machine to at least detect a non-series-parallel node in sequential code, generate instructions for prior nodes including a consumption operand, generate a combination instruction to combine results of the instructions, and output the combination instructions and the instructions to generate data flow code.

Example 10 includes a non-transitory computer readable medium as defined in example 9, wherein the consumption operand is an ignore operand.

Example 11 includes a non-transitory computer readable medium as defined in example 9 or example 10, wherein the instructions, when executed, cause the machine to detect that a control flow graph of the sequential code is a non-series-parallel flow graph.

Example 12 includes a non-transitory computer readable medium as defined in example 9 or example 10, wherein the instructions are pick instructions.

Example 13 includes a non-transitory computer readable medium as defined in example 9, wherein the consumption operand is a white value.

Example 14 includes a non-transitory computer readable medium as defined in example 13, wherein the instructions, when executed, cause the machine to generate instructions to consume the white value.

Example 15 includes a non-transitory computer readable medium as defined in example 9 or example 10, wherein the instructions, when executed, cause the machine to detect the non-series parallel node by analyzing a control dependence graph.

Example 16 includes a non-transitory computer readable medium as defined in example 15, wherein the instructions, when executed, cause the machine to identify the non-series parallel node when the control dependence graph has more than one parent for the non-series parallel node.

Example 17 includes a method to compile code, the method comprising detecting a non-series-parallel node in sequential code, generating instructions for prior nodes including a consumption operand, generating a combination instruction to combine results of the instructions, and outputting the combination instructions and the instructions to generate data flow code.

Example 18 includes a method as defined in example 17, wherein the consumption operand is an ignore operand.

Example 19 includes a method as defined in example 17 or example 18, further including detecting that a control flow graph of the sequential code is a non-series-parallel flow graph.

Example 20 includes a method as defined in example 17 or example 18, wherein the instructions are pick instructions.

Example 21 includes a method as defined in example 17, wherein the consumption operand is a white value.

Example 22 includes a method as defined in example 21, further including generating instructions to consume the white value.

Example 23 includes a method as defined in example 17 or example 18, further including detecting the non-series parallel node by analyzing a control dependence graph.

Example 24 includes a method as defined in example 23, further including identifying the non-series parallel node when the control dependence graph has more than one parent for the non-series parallel node.

Example 25 includes an apparatus to convert a control flow code to data flow code, the apparatus comprising means for detecting a non-series-parallel node in sequential code, and means for generating instructions to generate instructions for prior nodes including a consumption operand, generate a combination instruction to combine results of the instructions, and output the combination instructions and the instructions to generate data flow code.

Example 26 includes an apparatus as defined in example 25, wherein the consumption operand is an ignore operand.

Example 27 includes an apparatus as defined in example 25 or example 26, further means for detecting that a control flow graph of the sequential code is a non-series-parallel flow graph.

Example 28 includes an apparatus as defined in example 25 or example 26, wherein the instructions are pick instructions.

Example 29 includes an apparatus as defined in example 25, wherein the consumption operand is a white value.

Example 30 includes an apparatus as defined in example 29, wherein the means for generating instructions is further to generate instructions to consume the white value.

Example 31 includes an apparatus as defined in example 25 or example 26, wherein the means for detecting is to detect the non-series parallel node by analyzing a control dependence graph.

Example 32 includes an apparatus as defined in example 31, wherein the means for detecting is to identify the non-series parallel node when the control dependence graph has more than one parent for the non-series parallel node.

From the foregoing, it will be appreciated that example methods, apparatus and articles of manufacture have been disclosed that enable the efficient conversion of non-series-parallel sequential code to data flow code. In some examples, the use of a consumption operand in converted instructions allows the execution of originally non-series-parallel code on a parallel computing system such as a high performance computing system operating a data flow architecture.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to convert a control flow code to data flow code, the apparatus comprising:
    a logic circuit;
    a node analyzer to detect a non-series-parallel node in sequential code; and
    an instruction generator to:
        generate PICK instructions for prior nodes associated with the detected non-series-parallel node, the PICK instructions including a first operand to a value to propagate to the non-series-parallel node and a second operand that is a consumption operand identified as an ignore operand, the ignore operand to cause any value assigned to the ignore operand to be consumed but not stored;
        generate a combination instruction to combine results of the instructions generated for the prior nodes; and
        output the combination instructions and the instructions generated for the prior nodes to generate data flow code, wherein at least one of the node analyzer or the instruction generator are implemented by the logic circuit.

2. The apparatus as defined in claim 1, further including a non-series-parallel detector to detect that a control flow graph of the sequential code is a non-series-parallel flow graph.

3. The apparatus as defined in claim 1, wherein the consumption operand includes a white value.

4. The apparatus as defined in claim 3, wherein the instruction generator is further to generate instructions to consume the white value.

5. The apparatus as defined in claim 1, wherein the node analyzer is to detect the non-series parallel node by analyzing a control dependence graph.

6. The apparatus as defined in claim 5, wherein the node analyzer is to identify the non-series parallel node when the control dependence graph has more than one parent for the non-series parallel node.

7. A non-transitory computer readable medium comprising instructions that, when executed, cause a machine to at least:
    detect a non-series-parallel node in sequential code;
    generate PICK instructions for prior nodes associated with the detected non-series-parallel node, the PICK instructions including a first operand to a value to propagate to the non-series-parallel node and a second operand that is a consumption operand identified as an ignore operand, the ignore operand to cause any value assigned to the ignore operand to be consumed but not stored;
    generate a combination instruction to combine results of the instructions generated for the prior nodes; and
    output the combination instructions and the instructions generated for the prior nodes to generate data flow code.

8. The non-transitory computer readable medium as defined in claim 7, wherein the instructions, when executed, cause the machine to detect that a control flow graph of the sequential code is a non-series-parallel flow graph.

9. The non-transitory computer readable medium as defined in claim 7, wherein the consumption operand includes a white value.

10. The non-transitory computer readable medium as defined in claim 9, wherein the instructions, when executed, cause the machine to generate instructions to consume the white value.

11. The non-transitory computer readable medium as defined in claim 7, wherein the instructions, when executed, cause the machine to detect the non-series parallel node by analyzing a control dependence graph.

12. The non-transitory computer readable medium as defined in claim 11, wherein the instructions, when executed, cause the machine to identify the non-series parallel node when the control dependence graph has more than one parent for the non-series parallel node.

13. A method to compile code, the method comprising:
    detecting a non-series-parallel node in sequential code;
    generating PICK instructions for prior nodes associated with the detected non-series-parallel node, the PICK instructions including a first operand to a value to propagate to the non-series-parallel node and a second operand that is a consumption operand identified as an ignore operand, the ignore operand to cause any value assigned to the ignore operand to be consumed but not stored;
    generating a combination instruction to combine results of the instructions generated for the prior nodes; and outputting the combination instructions generated for the prior nodes and the instructions to generate data flow code.

14. The method as defined in claim 13, further including detecting that a control flow graph of the sequential code is a non-series-parallel flow graph.

15. The A method as defined in claim 13, wherein the consumption operand includes a white value.

16. The method as defined in claim 15, further including generating instructions to consume the white value.

17. The method as defined in claim 13, further including detecting the non-series parallel node by analyzing a control dependence graph.

18. The method as defined in claim 17, further including identifying the non-series parallel node when the control dependence graph has more than one parent for the non-series parallel node.

* * * * *